(12) United States Patent
Piva

(10) Patent No.: US 12,186,940 B2
(45) Date of Patent: Jan. 7, 2025

(54) PROCESS FOR TREATING POLYMER GRANULAR MATERIAL AND PLANT OPERATING ACCORDING TO SUCH A PROCESS

(71) Applicant: PEGASO INDUSTRIES S.P.A., Borgoricco (IT)

(72) Inventor: Rinaldo Piva, Borgoricco (IT)

(73) Assignee: Pegaso Industries S.p.A., Borgoricco (IT)

( * ) Notice: Subject to any disclaimer, the term of this patent is extended or adjusted under 35 U.S.C. 154(b) by 597 days.

(21) Appl. No.: 17/311,744

(22) PCT Filed: Dec. 12, 2019

(86) PCT No.: PCT/IB2019/060695
§ 371 (c)(1),
(2) Date: Jun. 8, 2021

(87) PCT Pub. No.: WO2020/121236
PCT Pub. Date: Jun. 18, 2020

(65) Prior Publication Data
US 2022/0024076 A1    Jan. 27, 2022

(30) Foreign Application Priority Data

Dec. 12, 2018 (IT) .................... 102018000011013

(51) Int. Cl.
*B29B 13/06* (2006.01)
*B29B 9/16* (2006.01)
(Continued)

(52) U.S. Cl.
CPC .............. *B29B 13/065* (2013.01); *B29B 9/16* (2013.01); *B29C 48/287* (2019.02);
(Continued)

(58) Field of Classification Search
CPC ........ B29C 2948/92038; B29C 48/287; B29C 48/793; B29C 2035/0283; B29B 13/06;
(Continued)

(56) References Cited

U.S. PATENT DOCUMENTS 6,745,492 B1   6/2004  Haesendonckx
10,571,192 B2 * 2/2020  Bellio ..................... F26B 21/10
(Continued)

FOREIGN PATENT DOCUMENTS

DE    202013008299 U1 * 12/2013 ............. B29C 45/18
EP        1306635 A1 *  5/2003 ............. F26B 21/08
(Continued)

*Primary Examiner* — Atul P. Khare
(74) *Attorney, Agent, or Firm* — Volpe Koenig

(57) ABSTRACT

A process for treating polymer granular material (2) comprising the steps of heating and drying the polymer granular material in a drying hopper (10) by means of a drying gas, discharging a portion of the polymer granular material into an extruder (101), inside which the polymer granular material is brought to a molten or semi-molten state and transported along the extruder by a rotating screw (104) in order to be injected into a mould (102) or caused to pass through an extrusion head. The process provides for measuring a control parameter which is correlated with the rotation of the screw inside the extruder and regulating the flow rate of the drying gas on the basis of the control parameter.

10 Claims, 1 Drawing Sheet

(51) Int. Cl.
    *B29C 48/285*    (2019.01)
    *B29C 48/395*    (2019.01)
    *B29C 48/793*    (2019.01)
    *B29C 48/92*     (2019.01)
    *B29C 35/02*     (2006.01)
    *F26B 21/12*     (2006.01)

(52) U.S. Cl.
    CPC .......... *B29C 48/288* (2019.02); *B29C 48/397* (2019.02); *B29C 48/793* (2019.02); *B29C 48/92* (2019.02); *B29B 2009/168* (2013.01); *B29C 2035/0283* (2013.01); *B29C 2948/92038* (2019.02); *B29C 2948/92047* (2019.02); *B29C 2948/92838* (2019.02)

(58) Field of Classification Search
    CPC .. B29B 13/065; B29B 2009/168; F26B 21/12
    See application file for complete search history.

(56) References Cited

U.S. PATENT DOCUMENTS

| | | | |
|---|---|---|---|
| 10,675,784 B2 * | 6/2020 | Bellio | F26B 17/12 |
| 2007/0277392 A1 | 12/2007 | Zlotos et al. | |
| 2009/0057938 A1 * | 3/2009 | Zhang | B29C 45/7646 425/143 |
| 2018/0106545 A1 | 4/2018 | Bellio | |

FOREIGN PATENT DOCUMENTS

| | | | | |
|---|---|---|---|---|
| EP | 2447027 A1 | 5/2012 | | |
| WO | WO-2005077628 A1 * | 8/2005 | ........... | B29B 13/021 |
| WO | WO-2016087980 A1 * | 6/2016 | ........... | B29B 13/065 |
| WO | 2017103721 A1 | 6/2017 | | |

\* cited by examiner

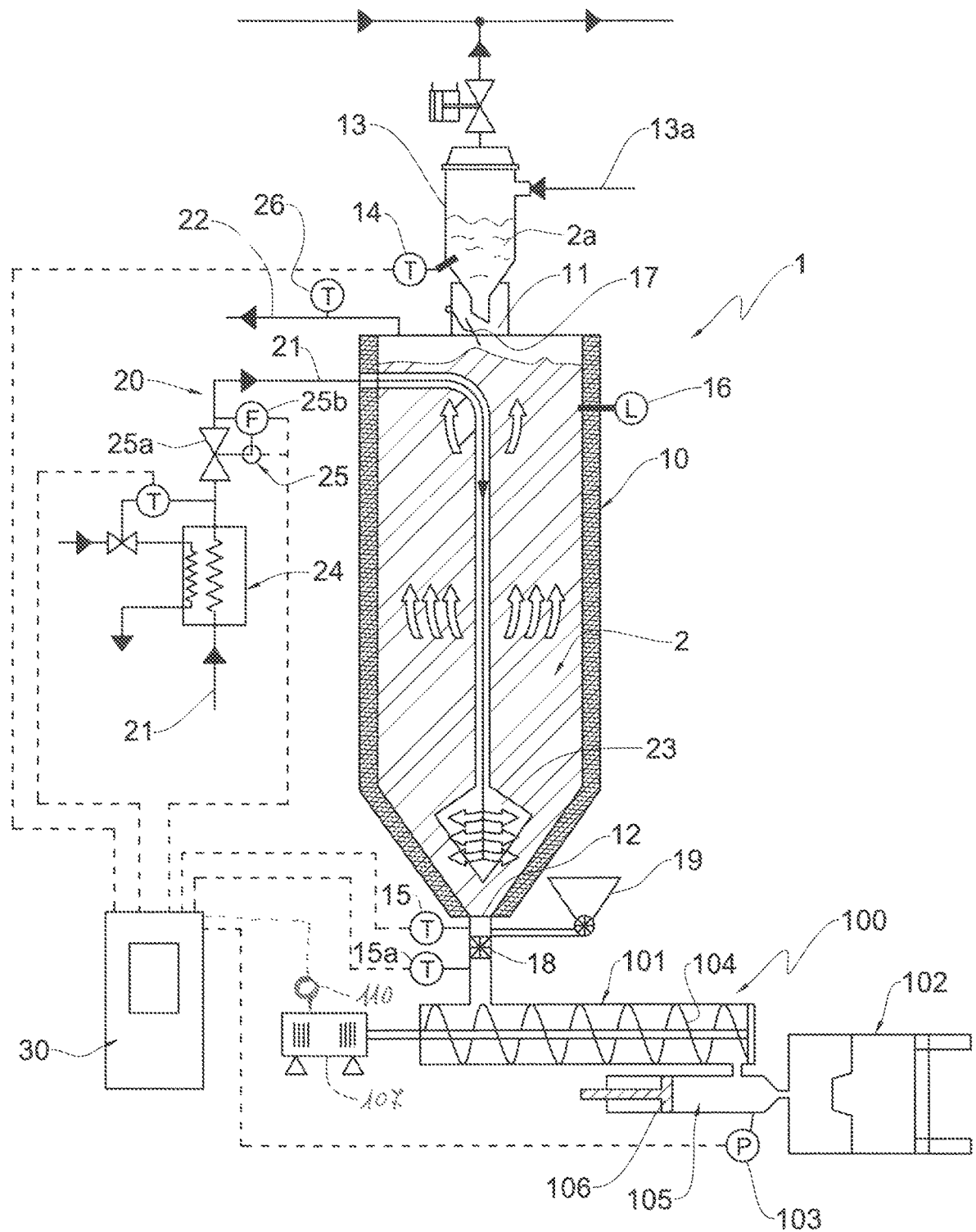

PROCESS FOR TREATING POLYMER GRANULAR MATERIAL AND PLANT OPERATING ACCORDING TO SUCH A PROCESS

TECHNICAL FIELD

The present invention relates to a process for treating polymer granular material comprising a drying stage for the granular material and a subsequent transformation stage by means of moulding or extrusion. The invention further relates to a processing plant which operates according to such a process.

TECHNOLOGICAL BACKGROUND

It is known that the transformation of plastics materials into granules by means of extrusion or moulding requires, in order to ensure an adequate level of quality of the moulded product, a level of humidity of the granular material which is as low as possible.

However, this requirement is difficult to reconcile with the high hygroscopic properties of some plastics materials which are widely used in the sector, such as, for example, the ones based on polyethylene terephthalate (PET) or polyamides (PA) or polycarbonate (PC) or some copolymers, such as ABS (acrylonitrile butadiene styrene).

Therefore, these plastics materials, before being subjected to the process of extrusion or moulding, have to be adequately dried in suitable drying plants, where the content of water of the granules is reduced to the minimum quantities required by the transformation process.

In a process which is commonly used, the drying of the polymer granular material is carried out inside a hopper in which the material which is intended to be dried is contained and in which a continuous flow of hot and dry air is introduced.

The subsequent transformation process of the dried polymer material provides for the material to be brought to a molten or semi-molten state in order to be able to be injected into a mould or extruded through a shaped head.

This step of the transformation process is typically carried out in an extruder where the granular material is brought to the molten and semi-molten state also as a result of the friction forces with which the material is urged by a screw so as to advance along the chamber of the extruder.

This step of the process requires a high supply of energy for melting the material, which is particularly hard if the melting is obtained inside an extruder, to the extent that in many cases the corresponding energy share determines a large part of the overall cost of the transformation process.

As a result, in the sector there is a great need to find new solutions which allow the consumption of energy to be reduced as much as possible.

Another need which is particularly perceived is to maintain the drying process under stable conditions so that the polymer granular material always reaches the transformation unit under the same (and optimum) temperature and humidity conditions.

With regard to the final temperature of the dried granular material, it is desirable for it to be as close as possible to the melting temperature but without reaching it, taking due account of the possible oxidation reactions which could lead to a degradation of the polymer.

The residual humidity content which is present in the dried granular material is generally defined by the transformation unit which is positioned downstream of the drying plant and it is determined on the basis of the characteristics of the transformation unit, the type of granular material and the type of final product which has to be obtained by the transformation of the granular material.

The Applicant has found that the stability of the drying process which should ensure the substantial constancy of the final parameters of the product being discharged from the hopper may be compromised by a number of factors, among which the variation of the parameters of the granular material being introduced takes on a particular significance, such as, for example, the temperature, the humidity content and also the composition of the granular material to be dried.

Furthermore, the Applicant has found that the process may become unstable as a result of other factors which are not directly correlated with the parameters of the material being introduced, such as, for example, errors which can be attributed to the operator during heating at the start of the process or during the charging of the material.

U.S. Pat. No. 6,449,875 describes a process for drying plastics materials in granules, in which some parameters of the drying gas, including the flow rate, can be regulated on the basis of the temperature of the granular material which is measured at the outlet from the hopper.

In the present description and in the appended claims, the term "granular material" is intended to be understood to mean a plurality of solid elements which are distinct and separate from each other and which have suitable dimensions and shapes in accordance with the processing to be carried out and the polymer material used, including polymer material in powdered form or in flakes.

Furthermore, the term "drying" is intended to be understood to mean the process, by means of which the humidity content of the polymer granular material is reduced to the desired values by the subsequent transformation process (moulding or extrusion), by means of substantial elimination of the water which is present in the internal regions of the granules.

By way of reference, the maximum residual humidity value which is required by the transformation unit may be approximately from 20 to 100 ppm (parts per million).

The expression "control parameter correlated with the rotation of the screw of an extruder" is intended to be understood to mean a parameter which is directly derivable from the rotation movement of the screw and, in particular, a parameter which is directly measurable by the actuation motor of the screw.

In this sense, therefore, there are defined as "control parameters correlated with the rotation of the screw": the rotation speed of the screw, the torque or the power necessary to rotate the screw.

On the contrary, the following are not defined as "control parameters correlated with the rotation of the screw": the viscosity of the molten plastics material inside the extruder, the pressure or the internal temperature with respect to the extruder.

DISCLOSURE OF INVENTION

The problem addressed by the present invention is to provide a process for treating polymer granular material and a processing plant which are structurally and functionally configured to at least partially overcome one or more of the disadvantages mentioned above with reference to the cited prior art.

This problem is solved by the present invention by means of a process and a plant which are produced in accordance with the appended claims.

In a first aspect thereof, the invention is directed towards a process for treating polymer granular material comprising the step of providing a suitable quantity of polymer granular material in a drying hopper.

Preferably, the process provides for the step of introducing into the drying hopper a drying gas having a predefined flow rate and temperature so as to heat the polymer granular material up to a desired discharge temperature and to dry the polymer granular material up to a desired residual humidity value.

Preferably, the process provides for the step of discharging a portion of the polymer granular material once it is heated to the discharge temperature into a transformation unit for the polymer material.

Preferably, the transformation unit comprises an extruder, inside which the polymer granular material which is discharged from the hopper is brought to a molten or semi-molten state and transported along the extruder by a rotating screw in order to then be injected into a mould or caused to pass through an extrusion head.

Preferably, the process provides for the step of measuring a control parameter which is correlated with the rotation of the screw inside the extruder and regulating the flow rate of the drying gas on the basis of the control parameter measured.

In a second aspect thereof, the present invention is directed towards a processing plant for polymer granular material comprising at least one drying hopper, in which there are formed an inlet for the polymer granular material and an outlet for the polymer granular material which is connected to a transformation unit for the polymer granular material.

Preferably, the plant further comprises a heating circuit, by means of which a drying gas is introduced into the drying hopper in order to heat the polymer granular material up to a discharge temperature and to dry the polymer granular material up to a predefined residual humidity value, and a regulation device for regulating the flow rate of the drying gas.

Preferably, the plant further comprises a transformation unit which is positioned downstream of the drying hopper and which comprises an extruder, inside which there is rotated a screw which heats the polymer granular material and transports it in the molten or semi-molten state along the extruder in order to be injected into a mould or caused to pass through an extrusion head.

Preferably, the plant further comprises a first sensor which is provided to measure a control parameter of the transformation unit which is correlated with the rotation of the screw inside the extruder.

Preferably, the plant further comprises a control unit which is connected at least to the first sensor and the regulation device of the flow rate of the drying gas and which is arranged to control the regulation device of the flow rate of the drying gas in accordance with the value of the control parameter which is measured by the first sensor.

As a result of the features of the invention, the drying process is advantageously controlled with feedback starting from the measurement of a control parameter of the transformation process which, however, has a direct correlation with one of the fundamental parameters of the drying process.

In fact, the Applicant has found that the action of rotation of the screw inside an extruder is directly correlated with the residual humidity content of the polymer material.

In addition, as mentioned above, the molten (or semi-molten) phase of the granular material inside the extruder is the most relevant phase in terms of energy consumption so that placing the control of the heating and drying step of the granular material as a direct function of a parameter which is correlated with the force of the screw allows more effective control of the overall energy consumption of the process.

Furthermore, this allows the conditions of the polymer material which is injected into the moulding unit or into the extrusion head to be kept more stable so as to ensure the maintenance of the quality parameters of the product.

The calculation of the new value of the drying gas flow rate may be carried out, for example, with a suitable algorithm or by following a predetermined table which also takes account, in addition to the measured value of the control parameter of the screw of the extruder, of other process parameters, such as the quantity of fresh granular material which is introduced into the drying hopper, the introduction temperature thereof, the residence time and the quantity of granular material present in the drying hopper.

The specific action of regulation of the drying gas flow rate may be carried out either by means of regulation valves or indirectly by acting on the rotation speed of a fan which supplies the drying gas to the drying hopper.

It may be noted that the regulation of the drying gas flow rate in accordance with the introduction temperature of the fresh polymer granular material does not exclude the fact that this flow rate is also regulated in accordance with the variation of other parameters. In particular, there is provision for the drying gas flow rate to be able to be regulated so as to be substantially proportional to the flow rate of polymer granular material discharged from the drying hopper and supplied to the transformation unit.

In at least one of the above-mentioned aspects, the present invention may have one or more of the preferred features to which the dependent claims relate.

In an embodiment thereof, the control parameter measured is the value of the torque necessary to rotate the screw inside the extruder at a predefined rotation speed.

In this manner, there is directly measured the force expended by the screw in order to rotate inside the extruder. This force is directly dependent on the viscosity of the molten or semi-molten polymer material which, with other conditions being the same, is a function of the degree of drying of the polymer material and can therefore be modified by varying the flow rate of the drying gas.

In this embodiment, the rotation speed of the screw remains constant so that the hourly production also remains constant.

In another embodiment, the control parameter measured is the rotation speed of the screw inside the extruder at a predefined torque value.

In another embodiment, the control parameter measured is the power consumed by the screw in order to rotate inside the extruder.

This value can be measured both by keeping constant the rotation speed and by keeping constant the torque which is applied to the screw.

In an embodiment of the invention, the control parameter correlated with the rotation of the screw of the extruder is measured at predefined time intervals so as to establish a progression over time of the values of the control parameter and the flow rate of the drying gas is regulated on the basis of the progression over time of these values so as to bring the progression over time of the control parameter to a constant value.

The values of the control parameter can be measured at time intervals which are less than 5 minutes, preferably less than 3 minutes, even more preferably at time intervals which correspond to a processing cycle of the transformation unit which is, for example, approximately from 10 to 20 seconds.

Preferably, there is also regulated on the basis of the control parameter, in addition to the flow rate of the drying gas, the dew point of the drying gas.

In this manner, the action of regulating the drying process of the polymer granular material is more effective.

BRIEF DESCRIPTION OF THE DRAWINGS

The features and advantages of the invention will be better appreciated from the detailed description of a preferred embodiment thereof which is illustrated by way of non-limiting example with reference to the appended drawing, in which FIG. 1 is a schematic view of a drying plant for polymer granular material which is constructed in order to operate according to the process of the present invention.

PREFERRED EMBODIMENTS OF THE INVENTION

With reference to FIG. 1, there is generally designated 1 a processing plant for a polymer granular material 2 operating according to the process of the present invention.

The plant 1 is provided to dry any polymer material in granules, for example, polyamides, polycarbonate or ABS copolymer, even though, in the specific example described here, the material processed is formed by PET granules (polyethylene terephthalate).

PET has a melting temperature of approximately 260° C. and a maximum temperature at which the polymer can be kept in air without being subjected to relevant oxidation phenomena of approximately 180° C.

The plant 1 is provided to supply a transformation unit 100 of the polymer granular material which comprises an extruder 101, in which the dried granular material is brought to the molten state inside a heating chamber, in which the material is advanced by means of at least one screw 104, an injection chamber 105 which is positioned downstream of the extruder 101, in which there is received the molten polymer material which is discharged by the extruder 101 and a mould 102, in which the molten polymer material is introduced from the injection chamber 105 by means of the action of a piston 106.

The screw 104 is rotated by a motor 107, according to methods which are known per se. There is associated with the extruder 101 at least one main sensor 110 which is provided to measure a control parameter, which is correlated with the rotation of the screw 104 inside the extruder 101.

In particular, the main sensor 110 measures a parameter which is directly dependent on the action of the screw during the rotation movement thereof inside the extruder.

In a first embodiment, the main sensor 110 measures the torque which is applied to the screw 104 in order to rotate it at a predefined rotation speed.

Preferably, in this case, the rotation speed of the screw 104 remains constant so as to also keep constant the hourly production of the extruder.

In a second embodiment, the main sensor 110 measures the rotation speed (measured, for example, in revolutions per minute—RPM) of the screw 104 when there is applied thereto a predefined torque. Preferably, in this case, the torque applied to the screw 104 remains constant.

In a third embodiment, the main sensor 110 measures the power consumed by the motor 107 in order to rotate the screw 104 at a predefined rotation speed or with a predefined torque.

A pressure measuring unit 103 which is provided to measure the pressure at which the molten polymer material is introduced into the mould 102 is mounted in the injection chamber 105.

In the present embodiment, there is provision for the transformation unit to comprise a mould, but it is similarly preferable for it to be possible to provide an extrusion head.

The plant 1 comprises a drying hopper 10, in which there are formed an inlet opening 11 through which the granular material 2 to be dried is introduced into the drying hopper 10 and an outlet opening 12, through which the granular material 2 which has been dried is discharged from the drying hopper 10.

The inlet opening 11 and outlet opening 12 are formed in the region of the top and bottom of the drying hopper 10, respectively.

The plant 1 further comprises a charging hopper 13 which is mounted immediately upstream of the drying hopper 10, in the region of the inlet opening 11, in which, by means of a charging line 13a, a quantity of fresh polymer granular material 2a which is ready to be introduced into the drying hopper 10 is prepared.

There is provided on the bottom of the charging hopper 13 a first temperature sensor 14 which is capable of measuring the inlet temperature of the fresh granular material 2a. The fresh granular material 2a is generally equal to the granular material 2 which is already present in the drying hopper 10, though with a different temperature and humidity, and can differ therefrom as a result of the type of PET used, for example, it may have a different percentage of recycled material.

There is provided between the charging hopper 13 and the drying hopper 10 a supply valve 17 for allowing, when necessary, the introduction of the fresh granular material into the drying hopper 10.

In the region of the bottom of the drying hopper 10, in the region of the outlet opening 12 there is further provided a second temperature sensor 15 which is provided to measure a discharge temperature of the granular material 2 which is ready to be discharged from the drying hopper 10.

The second temperature sensor 15 can be mounted in the discharge pipe which connects the drying hopper 10 to the extruder 101, upstream of a discharge valve 18 which allows the discharge of the dried granular material towards the transformation unit 100.

The plant 1 further comprises a metering device 19, which is connected immediately downstream of the outlet 12, on the discharge pipe of the drying hopper 10, defining a mixing location between the additives and the granular material 2 being discharged from the drying hopper. This mixing location is preferably upstream of the discharge valve 18.

A third temperature sensor 15a is further preferably mounted in the discharge pipe of the drying hopper 10, downstream of the discharge valve 18 and therefore also of the above-mentioned mixing location.

The plant 1 further comprises a heating circuit 20, by means of which there is introduced into the drying hopper 10 a drying gas which has a predefined temperature and flow rate in order to heat and dry the granular material 2 up to the desired temperature value and humidity content value.

The drying gas is preferably air.

The heating circuit 20 comprises a supply line 21 which carries the drying gas inside the drying hopper 10 and a recovery line 22, through which the drying gas is removed from the drying hopper 10.

The supply line emerges in the region of the bottom of the drying hopper at a diffuser 23 while the recovery line 22 is open near the top of the drying hopper 10 so that the drying gas flows through the hopper upwards from the bottom in counter-current with respect to the granular material 2.

There is provided on the supply line 21 a heater 24 which is provided to heat the drying gas to a predefined heating temperature and a flow regulation device 25 which is provided to regulate the flow rate of the drying gas which is supplied to the drying hopper 10.

The flow regulation device 25 in the embodiment described herein acts by varying the opening of one or more regulation valves 25*a*, by verifying the correctness of the regulation action by means of a flow rate measurement unit 25*b*. Alternatively, the regulation device 25 could act on an inverter which regulates the rotation speed of the blades of a fan which urges the drying gas along the supply line 21.

The drying gas which is introduced into the drying hopper 10 by means of the supply line 21 has a humidity value which is particularly low and which is obtained by means of a dehumidification treatment which is known per se and which is not illustrated in the appended FIGURE, comprising, for example, a pair of dehumidification towers which are filled with drying material, through which the drying gas is passed before reaching the heater 24.

The degree of drying of the process gas, which can be measured by means of the dew point thereof, can be advantageously regulated, for example, by providing for a fraction of the process gas to bypass the dehumidification towers and varying this fraction by means of a suitable regulation valve.

The plant 1 further comprises a control unit 30 which is provided to control and regulate the operating parameters of the plant 1.

The control unit 30 is connected to the main sensor 110 which is associated with the extruder 101, the flow regulation device 25 of the drying gas and preferably also the first temperature sensor 14, the second temperature sensor 15, the heater 24 and the injection pressure measurement unit 103.

Furthermore, preferably, the control unit 30 is also connected to the transformation unit 100 in order to receive information items concerning the quantity of granular material supplied thereto from the drying hopper 10, to a fourth temperature sensor 26 which measures the outlet temperature of the drying gas from the drying hopper 10, to a level sensor 16 which measures the level of granular material 2 inside the drying hopper 10, to the third temperature sensor 15*a*, to the supply valve and discharge valve 17, 18 and to the regulation valve for the bypass of the dehumidification towers which allows variation of the dew point of the drying gas which is supplied in the hopper.

In an embodiment which is not illustrated, the control unit 30 is further connected to load cells which detect the weight of the drying hopper 10 and the granular material 2 contained therein.

The plant 1, which is controlled by the control unit 30, operates in the manners described below.

In the drying hopper 10, the polymer granular material 2 is heated and dried by the drying gas which is dispersed in the mass of material through the diffuser 23.

The drying gas which is suitably dehumidified is supplied at a predefined heating temperature which is obtained and controlled in the heater 24, for example, of approximately 180° C., corresponding to the maximum temperature at which PET can be kept in air without being subjected to relevant oxidation phenomena.

The flow rate of the drying gas which is introduced into the drying hopper is regulated by the regulation device 25 which acts by varying the opening of the regulation valves 25*a* on the basis of the flow rate value supplied by the control unit 30 (set value) and the flow rate value which is measured by the flow rate measurement unit 25*b* (real value).

Alternatively, the flow rate of the drying gas may be regulated by varying the rotation speed of the fan, by means of an inverter and the measurement of the flow rate of the drying gas can be indirectly derived.

As set out above, the value at which the flow rate of the drying gas (set value) has to be imposed is defined by the control unit 30.

Initially, this flow rate value is a predefined value which is calculated, for example, on the basis of the heating temperature of the drying gas (generally predefined), a predefined inlet temperature of the granular material and the hourly flow rate of the granular material which is discharged from the drying hopper.

In particular, the predefined inlet temperature of the material can be equal to a predefined standard value which is typical of the plant 1, or a value which is imposed manually by the operator or a first temperature value which is measured by the first temperature sensor 14.

The hourly flow rate of the granular material which is discharged from the drying hopper can also be a predefined value which is imposed by the operator or which is typical of the plant 1.

As a result of the action of the drying gas, the granular material 2 reaches the region of the outlet opening 12 at a discharge temperature of approximately 180° C. and with a reduced residual humidity content, for example, of approximately 40 ppm.

At the request of the transformation unit 100, a portion of the granular material which is present at the bottom of the drying hopper 10 is discharged through the discharge opening 12 and supplied to the extruder 101 where, as a result of the action of the screw 104, it is melted and transported to the injection chamber 105, from where it is injected into the mould 102 by the piston 106.

When the level of granular material inside the drying hopper 10 falls until it reaches a predetermined level, a predetermined quantity of fresh granular material 2*a* is introduced into the drying hopper 10. This material is introduced through the inlet opening 11 from the charging hopper 13.

The flow rate of the drying gas is regulated by the control unit 30, by means of the regulation device 25, on the basis of the value of the control parameter which is measured by the main sensor 110, which, as set out above, can measure the torque which is applied to the screw 104, the rotation speed of the screw 104, or the power consumed by the motor in order to make it rotate. All these parameters measure the rotation action of the screw and are therefore dependent on the viscosity of the granular material inside the extruder 101.

In a first operating mode of the plant 1, there is provision, when the value of the control parameter moves away from a given predetermined value, for the control unit 30 to act on the flow rate of the drying gas so as to vary the drying conditions of the granular material in the hopper and to bring the viscosity into a preferred range of values.

For example, if the control parameter is the torque and the value measured by the main sensor 110 is less than a preferred value (or range of values), then the flow rate of the drying gas is increased by the control unit 30, while, if this measured value is higher than the preferred value (or range of values), then the flow rate of the drying gas is decreased.

Conversely, if the control parameter is the rotation speed and the value measured by the main sensor 110 is less than a preferred value (or range of values), then the flow rate of the drying gas is decreased by the control unit 30 while, if this measured value is higher than the preferred value (or range of values), then the flow rate of the drying gas is increased.

In a second operating mode of the plant 1, there is provision for the control unit 30 to regulate the flow rate of the drying gas in accordance with the progression over time of the value of the control parameter and not of the point-like (instant) value thereof.

In this case, the control unit 30 detects the value of the control parameter (for example, the applied torque) at regular time periods, for example, every 2 minutes or each cycle time of the mould 102 and establishes the progression thereof over time.

Then, if this progression shows that the control parameter does not remain sufficiently constant over time, but instead tends to decrease or increase, the control unit 30 acts on the regulation device 25 in order to bring this control parameter into the preferred values, with the objective of keeping the control parameter as constant as possible.

If, as a result of the regulation of the flow rate of process gas, the control parameter is not brought back into the preferred values or is brought back to such values in a manner which is too slow, then there is provision for the control unit 30 to be able also to regulate some other process parameter of the drying gas.

It is particularly preferable for the control unit 30, in addition to the flow rate, to be able to regulate the degree of humidity (dew point) of the process gas supplied in the hopper.

The plant and the process of the present invention can be constructed in different variants with respect to the preferred example described above.

As a result of the process and the plant of the present invention, it is possible to obtain excellent results in terms of stability of the drying process of the polymer granular material, by optimizing the energy efficiency of the process and the reliability thereof.

Another important advantage is given by the fact that the process of the invention allows an improvement of the performance levels in terms of qualitative yield and a reduction of the production of processing waste.

The invention claimed is:

1. A process for treating polymer granular material (2), the process comprising:
   providing the polymer granular material in a drying hopper (10),
   introducing into the drying hopper a drying gas having a predefined flow rate and temperature so as to heat the polymer granular material up to a discharge temperature and to dry the polymer granular material up to a predefined residual humidity value,
   discharging, from the hopper, a portion of the polymer granular material which is heated to the discharge temperature into a transformation unit (100) for the polymer material, which transformation unit comprises an extruder (101) inside which the polymer granular material discharged from the hopper is brought to a molten or semi-molten state and transported along the extruder by a rotating screw (104) in order to be injected into a mold (102) or caused to pass through an extrusion head,
   measuring a control parameter which is correlated with the rotation of the screw inside the extruder, wherein the control parameter is the power consumed by a motor rotating the screw, and
   regulating the flow rate of the drying gas on the basis of said measured control parameter.

2. The process according to claim 1, wherein the flow rate of the drying gas is further regulated on the basis of the torque applied to rotate the screw inside the extruder.

3. The process according to claim 1, wherein the flow rate of the drying gas is further regulated on the basis of the rotation speed of the screw inside the extruder.

4. The process according to claim 1, wherein the control parameter is the power consumed by the motor rotating the screw inside the extruder at a predefined rotation speed or at a predefined torque value.

5. The process according to claim 1, further comprising:
   measuring the control parameter at predefined time intervals,
   determining a progression over time of the control parameter on the basis of said measurements at predefined time intervals, and
   regulating the flow rate of the drying gas on the basis of the progression over time of the control parameter.

6. The process according to claim 1, wherein a dew point of the drying gas is further regulated on the basis of the control parameter.

7. A processing installation (1) for polymer granular material (2), the processing installation comprising:
   a drying hopper (10) comprising an inlet (11) for the polymer granular material and an outlet (12) for the polymer granular material,
   a heating circuit (20), by which a drying gas is introduced into the drying hopper in order to heat the polymer granular material up to a discharge temperature and to dry the polymer granular material up to a predefined residual humidity value,
   a regulation device (25) for regulating the flow rate of the drying gas,
   a transformation unit which is connected to the outlet of the drying hopper and comprises an extruder (101) inside which polymer granular material discharged from the drying hopper is brought to a molten or semi-molten state and transported along the extruder by a rotating screw (104) in order to be injected into a mold (102) or caused to pass through an extrusion head of the transformation unit,
   a main sensor (110) configured to measure a control parameter of the transformation unit which is correlated with the rotation of the screw (104) inside the extruder, wherein the control parameter is the power consumed by a motor rotating the screw, and
   a control unit (30) which is connected at least to the main sensor (110) and the regulation device (25) of the flow rate of the drying gas and is configured to control the regulation device (25) of the flow rate of drying gas in accordance with the value of the control parameter which is measured by the main sensor (110).

8. The processing installation according to claim 7, wherein the main sensor (110) is a first main sensor, and wherein the processing installation further comprises a second main sensor configured to measure a torque applied to the screw, the control unit further configured to control the regulation device (25) of the flow rate of the drying gas in accordance with the value of the torque which is measured by the second main sensor.

9. The processing installation according to claim 7, wherein the main sensor (110) is a first main sensor, and wherein the processing installation further comprises a second main sensor configured to measure a rotation speed of the screw, the control unit further configured to control the regulation device (25) of the flow rate of the drying gas in accordance with the value of the rotation speed which is measured by the second main sensor.

10. The processing installation according to claim 7, wherein the main sensor (110) is configured to measure power consumed by the motor rotating the screw inside the extruder at a predefined rotation speed or at a predefined torque value.

\* \* \* \* \*